(12) United States Patent
Lee

(10) Patent No.: US 11,727,088 B2
(45) Date of Patent: Aug. 15, 2023

(54) APPARATUS AND METHOD FOR TRAINING IMAGE CLASSIFICATION MODEL

(71) Applicant: SAMSUNG SDS CO., LTD., Seoul (KR)

(72) Inventor: Joon Ho Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 487 days.

(21) Appl. No.: 17/080,237

(22) Filed: Oct. 26, 2020

(65) Prior Publication Data
US 2022/0121883 A1   Apr. 21, 2022

(30) Foreign Application Priority Data

Oct. 15, 2020   (KR) .................. 10-2020-0133244

(51) Int. Cl.
| | |
|---|---|
| G06N 20/20 | (2019.01) |
| G06F 18/20 | (2023.01) |
| G06F 18/214 | (2023.01) |
| G06F 18/24 | (2023.01) |
| G06F 18/21 | (2023.01) |
| G06N 20/00 | (2019.01) |
| G06F 18/2431 | (2023.01) |

(52) U.S. Cl.
CPC ...... *G06F 18/2178* (2023.01); *G06F 18/2155* (2023.01); *G06F 18/2431* (2023.01); *G06N 20/00* (2019.01)

(58) Field of Classification Search
USPC .......................................................... 382/159
See application file for complete search history.

(56) References Cited

U.S. PATENT DOCUMENTS

| | | | |
|---|---|---|---|
| 2019/0272375 A1* | 9/2019 | Chen | G06N 5/045 |
| 2020/0327453 A1* | 10/2020 | Fu | G06N 20/00 |
| 2021/0225511 A1* | 7/2021 | Kiraly | G06N 3/08 |
| 2022/0319704 A1* | 10/2022 | Feng | G06T 7/0012 |

\* cited by examiner

*Primary Examiner* — Marcellus J Augustin
(74) *Attorney, Agent, or Firm* — Sughrue Mion, PLLC

(57) ABSTRACT

An apparatus for training an image classification model according to an embodiment disclosed includes a first trainer that trains a model body and a first head through supervised learning based on a labeled data set subjected to type 1 labeling, a second trainer that trains the model body, the first head, and a second head through multi-task learning based on the labeled data set and an unlabeled data set, and a third trainer that trains a plurality of third heads through supervised learning based on the labeled data set subjected to type 2 labeling while freezing the model body.

16 Claims, 6 Drawing Sheets

APPARATUS AND METHOD FOR TRAINING IMAGE CLASSIFICATION MODEL

CROSS REFERENCE TO RELATED APPLICATIONS AND CLAIM OF PRIORITY

This application claims the benefit of Korean Patent Application No. 10-2020-0133244 filed in the Korean Intellectual Property Office on Oct. 15, 2020, the entire contents of which are incorporated herein by reference.

TECHNICAL FIELD

The disclosed embodiments relate to technology for training an image classification model.

BACKGROUND ART

The conventional image classification model using deep learning exhibits image classification performance that surpasses humans and has been widely used in various industries.

However, such an image classification model has exhibited its performance by being limited to coarse-grained classification to the extent of identifying what kind of objects contained in the image, and it is difficult to secure high performance due to a lack of training image data in fine-grained classification in which the objects should be classified only by detailed differences such as animal species, plant varieties, and disease types at a specific location.

In addition, in order for the image classification model to extract several features in the image, training image data that has been subjected to multi-labeling is required for several parts of the image, but the number of multi-labeled image data is significantly smaller than that of single-labeled image data, and thus there is a problem in that it is also difficult to predict performance improvement for extracting multiple features of the image classification model.

SUMMARY

The disclosed embodiments are intended to provide means for training an image classification model.

A method for training an image classification model according to an embodiment disclosed is a method performed by a computing device including one or more processors and a memory for storing one or more programs executed by the one or more processors, the method including a first training step of training a model body and a first head through supervised learning based on a labeled data set subjected to type 1 labeling, a second training step of training the model body, the first head, and a second head through multi-task learning based on the labeled data set and an unlabeled data set, and a third training step of training a plurality of third heads through supervised learning based on the labeled data set subjected to type 2 labeling while freezing the model body, in which the model body extracts feature vector for input data, and each of the first head, the second head, and the third head generates a classification result based on the feature vector.

In the type 1 labeling, when image data included in the labeled data set has a single label, the image data having the single label may be classified into a class corresponding to the single label, and when the image data included in the labeled data set has multiple labels, the image data having the multiple labels may be classified into a new class corresponding to the multiple labels themselves.

In the second training step, the model body and the first head may be trained through supervised learning again based on the labeled data set, and the model body and the second head may be trained through self-supervised learning.

In the second training step, the model body and the first head may be trained through supervised learning again by reflecting changes to one or more hyper parameters obtained from a user.

In the second training step, the model body and the second head may be trained through self-supervised learning based on derived data transformed from image data included in the labeled data set.

In the second training step, the model body and the first head may be trained through unsupervised learning based on the unlabeled data set.

In the type 2 labeling, each image data included in the labeled data set may be subjected to binary classification according to whether or not each image data included in the labeled data set has a label corresponding to a specific class.

In the third training step, based on the labeled data set classified into a plurality of classes according to the type 2 labeling, each of the plurality of third heads corresponding to each of the plurality of classes may be trained through supervised learning.

An apparatus for training an image classification model according to an embodiment disclosed includes a first trainer that trains a model body and a first head through supervised learning based on a labeled data set subjected to type 1 labeling, a second trainer that trains the model body, the first head, and a second head through multi-task learning based on the labeled data set and an unlabeled data set, and a third trainer that trains a plurality of third heads through supervised learning based on the labeled data set subjected to type 2 labeling while freezing the model body, in which the model body extracts feature vector for input data, and each of the first head, the second head, and the third head generates a classification result based on the feature vector.

In the type 1 labeling, when image data included in the labeled data set has a single label, the image data having the single label may be classified into a class corresponding to the single label, and when the image data included in the labeled data set has multiple labels, the image data having the multiple labels may be classified into a new class corresponding to the multiple labels themselves.

The second trainer may train the model body and the first head through supervised learning again based on the labeled data set, and may train the model body and the second head through self-supervised learning.

The second trainer may train the model body and the first head through supervised learning again by reflecting changes to one or more hyper parameters obtained from a user.

The second trainer may train the model body and the second head through self-supervised learning based on derived data transformed from image data included in the labeled data set.

The second trainer may train the model body and the first head through unsupervised learning based on the unlabeled data set.

In the type 2 labeling, each image data included in the labeled data set may be subjected to binary classification according to whether or not each image data included in the labeled data set has a label corresponding to a specific class.

The third trainer, based on the labeled data set classified into a plurality of classes according to the type 2 labeling, may train each of the plurality of third heads corresponding to each of the plurality of classes through supervised learning.

According to the disclosed embodiments, it is possible for the image classification model to more effectively learn the fine features required for fine-grained image classification by converting the labels of the image data into various types to train the image classification mode.

In addition, according to the disclosed embodiments, it is possible to reduce the amount of time and resources required for training by making lighten the overall structure of the image classification model by constructing several model heads in parallel while sharing a model body.

DETAILED DESCRIPTION

Hereinafter, a specific embodiment of the present invention will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies may unnecessarily obscure the subject matter of the disclosed embodiments, a detailed description thereof will be omitted. In addition, terms to be described later are terms defined in consideration of functions in the disclosed embodiments, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
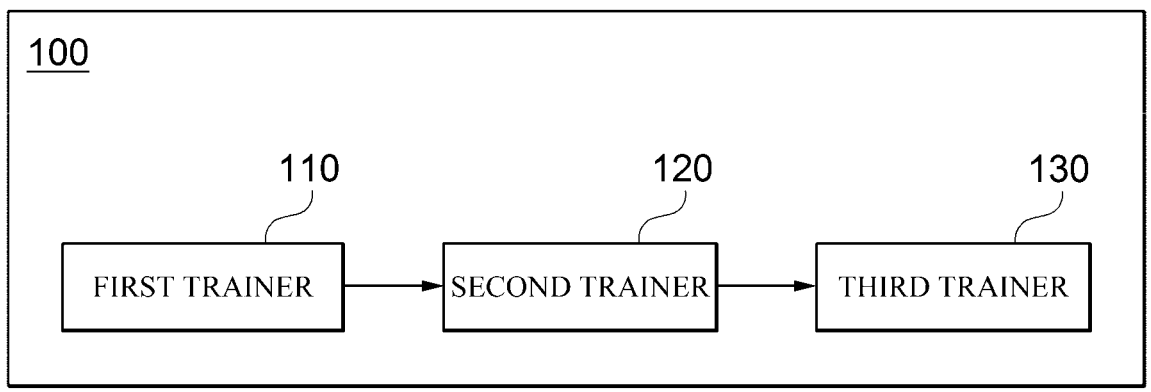
FIG. 1 is a block diagram for illustrating an apparatus for training an image classification model according to an embodiment.

FIG. 1 is a block diagram illustrating an apparatus 100 for training an image classification model according to an embodiment.

As illustrated, the apparatus 100 for training the image classification model according to an embodiment includes a first trainer 110, a second trainer 120, and a third trainer 130.

In the following embodiments, for convenience of explanation, a training process performed by the first trainer 110 is referred to as a 'first training step', and a training process performed by the second trainer 120 is referred to as a 'second training step', a training process performed by the third trainer 130 is referred to as a 'third training step'.

The first trainer 110 trains a model body and a first head through supervised learning based on a labeled data set subjected to type 1 labeling.

In the following embodiments, the 'model body' may mean a network structure for extracting a feature vector for input data.

In addition, in the following embodiments, the 'model head' may collectively refer to a network structure that generates a classification result based on the feature vector extracted from the model body, and each model head constituting each training step may be classified and referred to as a 'first head', a 'second head', a 'third head', etc.

According to an embodiment, in the type 1 labeling, when image data included in a labeled data set has a single label, the image data having a single label may be classified into a class corresponding to the single label.

Meanwhile, according to an embodiment, in the type 1 labeling, when the image data included in the labeled data set has multiple labels, the image data having multiple labels may be classified into a new class corresponding to the multiple labels themselves.

For example, when the image data included in the labeled data set can be labeled in all combinations using label A, label B, and label C, each image data may have A, B or C as the single label and may have A+B, B+C, A+C, or A+B+C as the multiple labels. In this case, according to the type 1 labeling, each image data may be classified into a class corresponding to each of A, B, and C, as well as a new class corresponding to each of A+B, B+C, A+C, and A+B+C.

Specifically, in the type 1 labeling, the image data having multiple labels may be classified based on an extended single label (ESL).

According to an embodiment, for the same image data, the first trainer 110 may calculate a loss function value based on a difference between a label generated by the type 1 labeling and a classification result output from the first head.

Thereafter, the first trainer 110 may update a training parameter of each of the model body and the first head based on the calculated loss function value. In this case, the training parameter may be, for example, a weight or a bias applied to a layer included in the network structure of each of the model body or the first head.

Meanwhile, according to an embodiment, the first trainer 110 may calculate the loss function value described above by using a cross entropy function as a loss function.

The second trainer 120 trains the model body, the first head, and a second head through multi-task learning based on the labeled data set subjected to type 1 labeling and an unlabeled data set.

In the following embodiments, the 'unlabeled data set' means a data set composed of unlabeled data. Specifically, depending on the embodiment, the unlabeled data set may be composed of data estimated to belong to the same or similar domain as the labeled data set used for training together, and thus the training effect of the image classification model may be improved.

In addition, in the following embodiments, 'multi-task learning' means training the image classification model by applying various types of learning such as supervised learning and unsupervised learning in a complex manner.

According to an embodiment, the second trainer 120 may train the model body and the first head through supervised learning again based on the labeled data set subjected to type 1 labeling.

Specifically, the second trainer 120 may train the model body and the first head through supervised learning again by reflecting changes to one or more hyper parameters obtained from a user.

In more detail, the 'hyper parameter' means a value of a variable that is preset by the user for training the image classification model, and may include, for example, a learning rate, an epoch number, a batch number, etc.

For example, the second trainer 120 may train the model body and the first head through supervise learning by applying a learning rate different from the learning rate applied in the first training step.

The second trainer may train the model body and the second head through self-supervised learning based on the labeled data set subjected to type 1 labeling.

In the following embodiments, the 'self-supervised learning' means supervised learning performed using a label generated by a specific algorithm itself without using a human-made label. Through this, supervised learning can be performed without human intervention other than inputting data for training.

Specifically, the second trainer may train the model body and the second head through self-supervised learning based on derived data transformed from the image data included in the labeled data set subjected to type 1 labeling.

In more detail, the derived data may be generated by applying a predefined transformation function to image data. For example, the derived data may be generated by applying a flip function to the image data and flipping the image data in the up-and-down or left-and-right direction, and may also be generated by applying a rotate function and rotating the image data by 90 degrees, 180 degrees, 270 degrees, etc.

In this case, the derived data may be classified into a plurality of classes in consideration of a type of the applied transform function and the transform magnitude, and may have a self-label corresponding to each class.

In addition, according to an embodiment, since the self-supervised learning method may also be applied to data not having a label, the second trainer 120 may train the model body and the second head through self-supervised learning additionally based on the unlabeled data set.

Meanwhile, according to an embodiment, the second trainer 120 may train the model body and the first head through unsupervised learning based on the unlabeled data set.

Specifically, the second trainer 120 may use the unlabeled data set as training data, but may train the model body and the first head through unsupervised learning based on consistency regularization (CR).

In the following embodiments, 'consistency regularization' means a method for training a model, which is previously trained with a labeled data set, to be classified in the same manner as a ground truth (GT) when processed data with noise (perturbation) applied to data not having a label is classified by the same model after assuming that a result of classifying the data not having the label by the model is the ground truth.

According to this, the second trainer 120 may assume a result obtained by inputting the image data included in the unlabeled data set to the model body and being classified by the first head as the ground truth, compare a result obtained by inputting processed data with noise applied to the input image data to the model body again and being classified by the first head with the ground truth, and calculate a loss function value based on the difference between the two.

Thereafter, the second trainer 120 may update the training parameter of each of the model body and the first head based on the calculated loss function value. In this case, the training parameter may be, for example, a weight or a bias applied to a layer included in the network structure of each of the model body or the first head.

Meanwhile, according to an embodiment, the second trainer 120 may calculate the loss function value described above using virtual adversarial training (VAT) according to a VAT loss or an entropy minimization (EntMin) loss function according to EntMin.

That is, in other words, the second trainer 120 may train the first head based on each of the loss functions calculated by supervised learning and unsupervised learning, and may train the second head based on the loss function calculated by self-supervised learning.

In addition, the second trainer 120 may train the model body based on the total loss function obtained by performing weighted summation of each of the loss functions calculated by supervised learning, self-supervised learning, and unsupervised learning.

In this case, according to an embodiment, although a scaling coefficient applied to a loss function calculated by self-supervised learning may be set to 0.1, and a scaling factor applied to a loss function calculated by unsupervised learning may be set to 0.5, it is not necessarily limited thereto, and it is obvious that the scaling factor for optimal training may vary according to a setting value of a hyper parameter and data used for training.

The third trainer 130 trains a plurality of third heads through supervised learning based on the labeled data set 1 subjected to type 2 labeling while freezing the model body.

According to an embodiment, in the type 2 labeling, each image data included in the labeled data set may be subjected to binary classification according to whether or not each image data included in the labeled data set has a label corresponding to a specific class.

For example, when a label included in the image data can be classified as one of Class A, Class B, and Class C, according to the type 2 labeling, any one of A, B, and C is set as a specific class as a reference, and each image data can be classified into data having a label corresponding to the specific class and data not having the label.

According to an embodiment, in the type 2 labeling, the image data included in the labeled data set may be classified based on a one versus rest label (OVR).

According to an embodiment, the third trainer 130 may train each of the plurality of third heads corresponding to each of the plurality of classes through supervised learning based on the labeled data set classified into a plurality of classes according to the type 2 labeling.

For example, the third trainer 130 may train the third head corresponding to class A through supervised learning, based on the labeled data set classified into data having a label corresponding to class A and data not having the label.

As another example, the third trainer 130 may train the third head corresponding to class B through supervised learning, based on the labeled data set classified into data having a label corresponding to class B and data not having the label.

That is, according to this, it can be said that the number of third heads may be the same as the number of classes of labeled data set subjected to type 2 labeling and each of the third heads plays a role of determining whether each image data included in the labeled data set has a label corresponding to a specific class.

According to an embodiment, for the same image data, the third trainer 130 may calculate, a loss function value based on a difference between a label generated by the type 2 labeling and a classification result output from each of the third heads.

Thereafter, the third trainer 130 may update the training parameter of each of the third heads based on the calculated loss function value. In this case, the training parameter may be, for example, a weight or a bias applied to a layer included in the network structure of each of the third heads.

In the illustrated embodiment, each configuration may have different functions and capabilities in addition to those described below, and may include additional configurations in addition to those described below.

In addition, in one embodiment, the first trainer 110, the second trainer 120, and the third trainer 130 may be implemented using one or more physically separated devices, or may be implemented by one or more processors or a combination of one or more processors and software, and may not be clearly distinguished in specific operations unlike the illustrated example.

Figure 2:
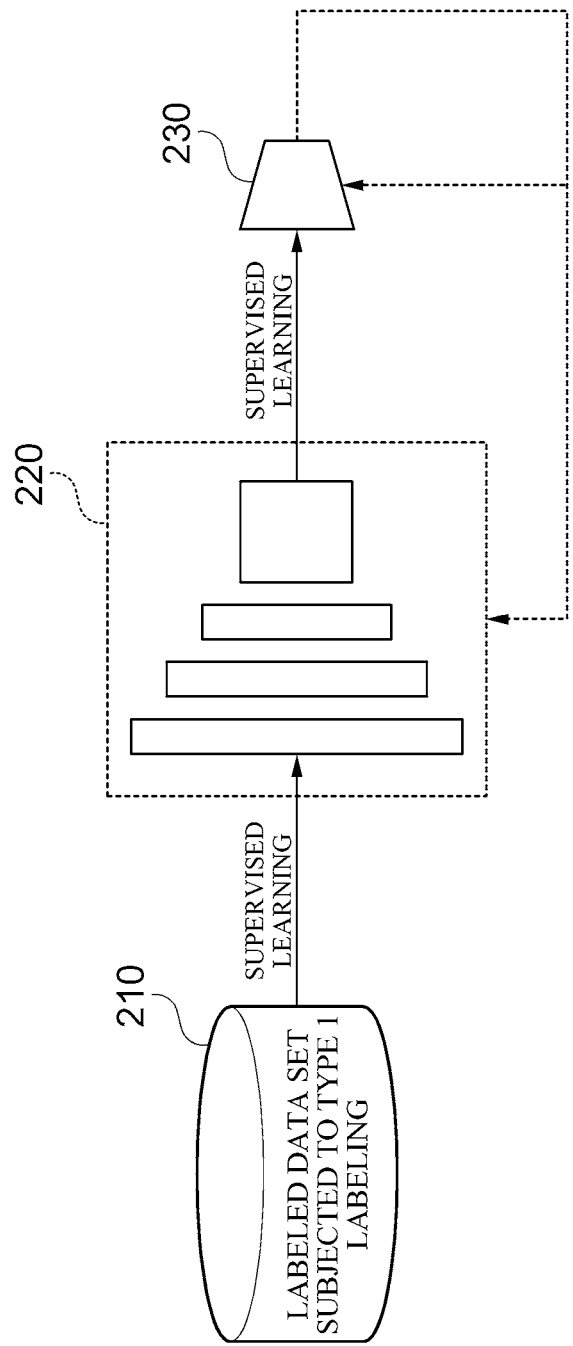
FIG. 2 is a block diagram for describing a first training step according to an embodiment.

FIG. 2 is a block diagram 200 for describing a first training step according to an embodiment.

Referring to FIG. 2, first, at least a part of image data included in a labeled data set 210 subjected to type 1 labeling is input to a model body 220.

Thereafter, the model body 220 generates a feature vector obtained by extracting features of the input image data, and the generated feature vector is input to a first head 230.

Thereafter, the first head 230 classifies the image data based on the input feature vector.

Thereafter, the first trainer 110 calculates a loss function value based on the classification result and a label previously generated by the type 1 labeling, and trains the model body 220 and the first head 230 through supervised learning.

Figure 3:
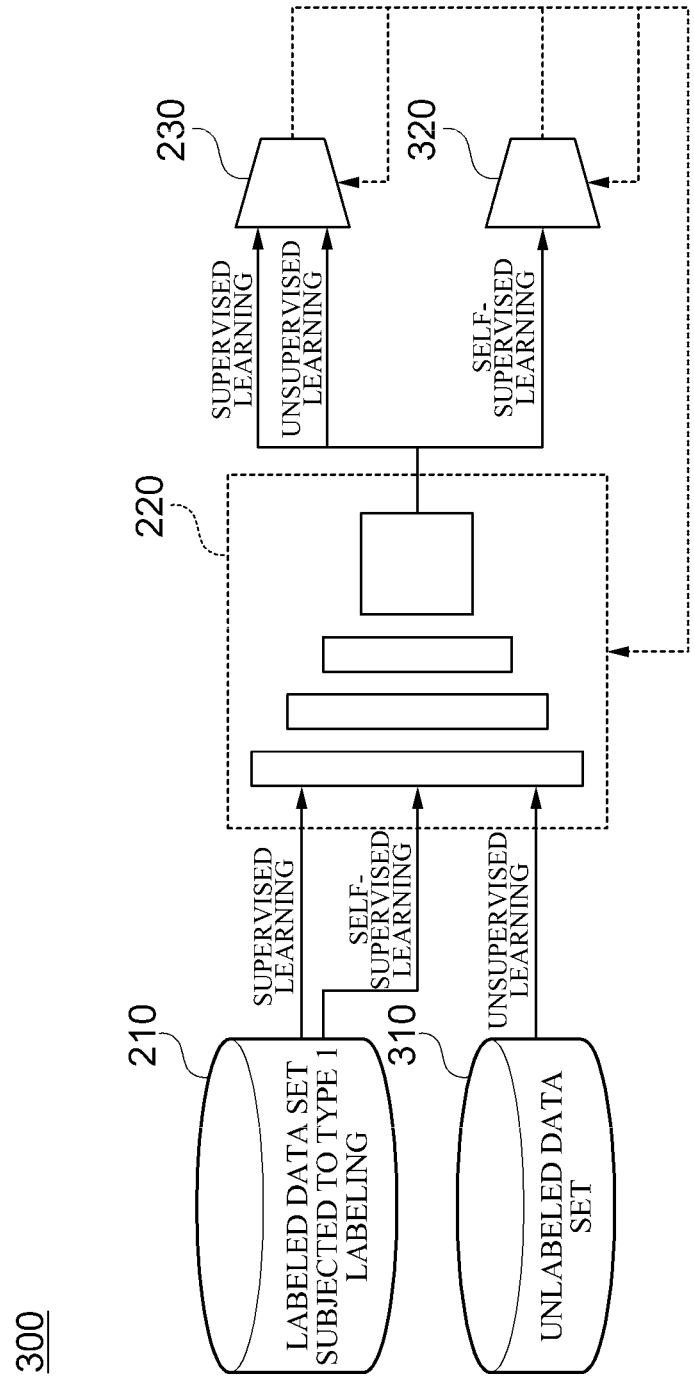
FIG. 3 is a block diagram for describing a second training step according to an embodiment.

FIG. 3 is a block diagram 300 for describing a second training step according to an embodiment.

Referring to FIG. 3, first, at least a part of the image data included in the labeled data set 210 subjected to type 1 labeling and derived data generated from the image data are input to the model body 220.

Thereafter, the model body 220 generates a feature vector obtained by extracting features of each of the input image data and the derived data, and the generated feature vector is input to the first head 230.

Thereafter, the first head 230 classifies each of the image data and the derived data based on the input feature vector.

Thereafter, the second trainer 120 calculates a loss function value for supervised learning based on the classification result and a label previously generated by the type 1 labeling, trains the model body 220 and the first head 230 through supervised learning, calculates a loss function value for self-supervised learning based on the classification result and the label generated by itself in a process of generating the derived data, and trains the model body 220 and the first head 230 through supervised learning.

Meanwhile, at least a part of the image data included in an unlabeled data set 310 is input to the model body 220.

Thereafter, the model body 220 generates a feature vector obtained extracting features of each of the input image data, and the generated feature vector is input to a second head 320.

Thereafter, the second head 320 classifies each image data based on the input feature vector.

Thereafter, the second trainer 120 calculates a loss function value for unsupervised learning, and trains the model body 220 and the second head 320 through supervised learning.

Figure 4:
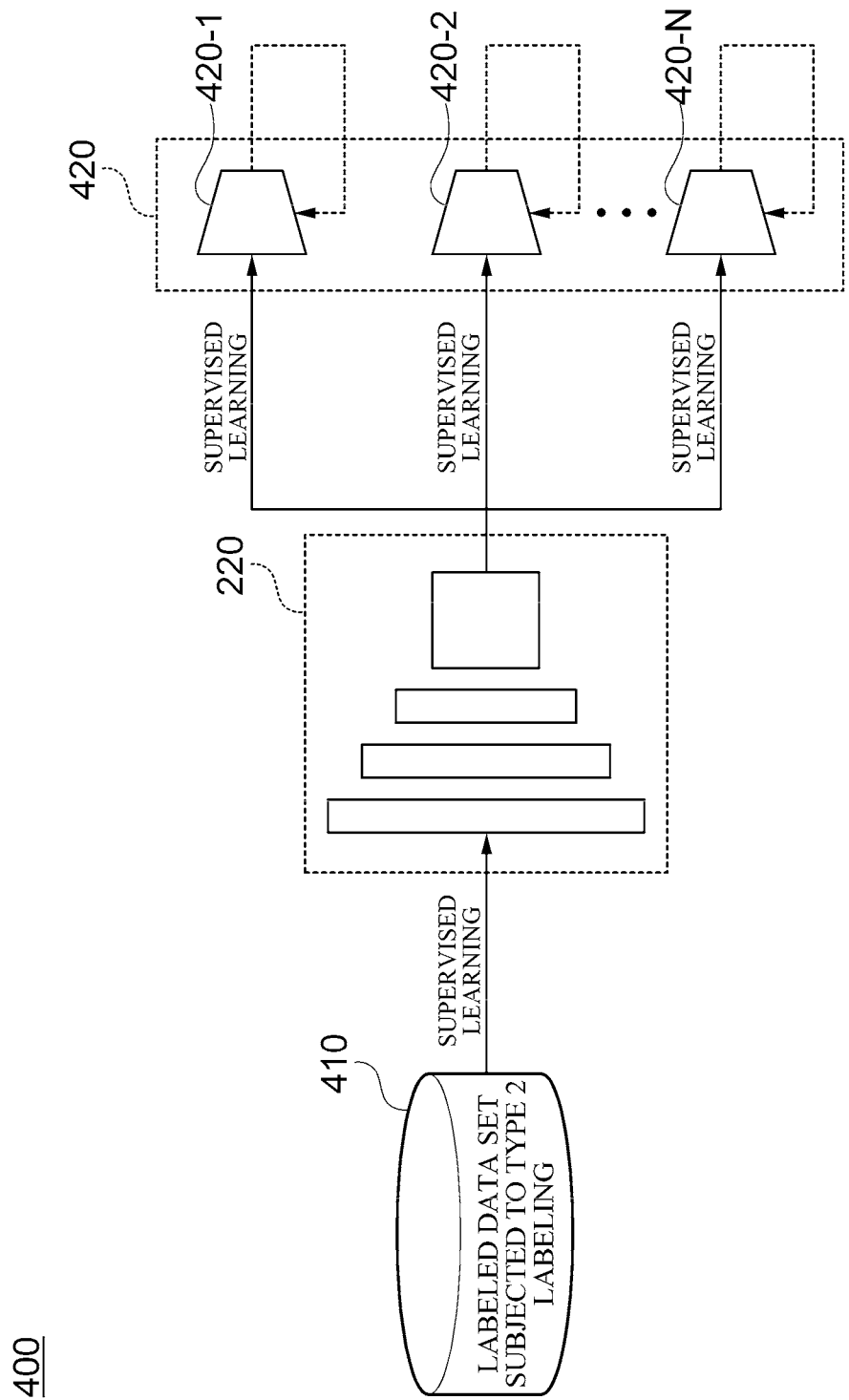
FIG. 4 is a block diagram for describing a third training step according to an embodiment.

FIG. 4 is a block diagram 400 for describing a third training step according to an embodiment.

Referring to FIG. 4, first, at least a part of the image data included in a labeled data set 410 subjected to type 2 labeling is input to the model body 220.

Thereafter, the model body 220 generates a feature vector obtained by extracting features of the input image data d, and the generated feature vector is input a third head 420. In this case, in FIG. 4, although a feature vector for one image data is illustrated as being simultaneously input to each of the third heads 420-1, 420-2, . . . , 420-N, this is for simplicity of expression, and actually, it should be noted that a feature vector obtained by extracting features of image data classified based on a specific class is input to only one of the third heads 420.

Thereafter, each of the third heads 420-1, 420-2, . . . , 420-N classifies the image data based on the input feature vector.

Thereafter, the third trainer 130 calculates a loss function value based on the classification result and a label previously generated by the type 2 labeling, and trains the model body 220 and each of the third head 420-1, 420-2, . . . , 420-N through supervised learning.

Figure 5:
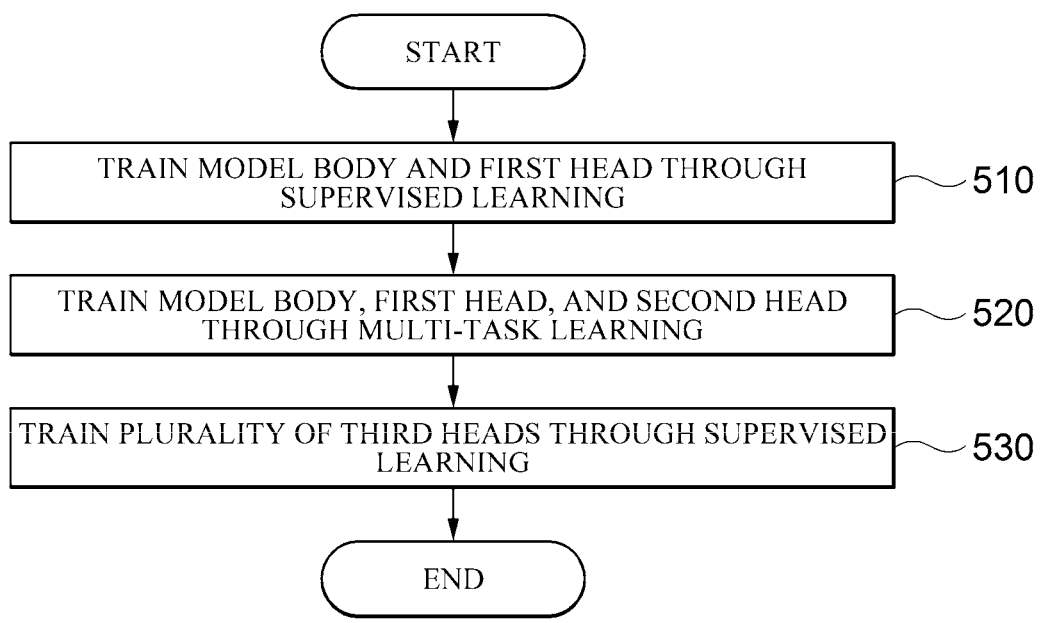
FIG. 5 is a flowchart for describing a method for training an image classification model according to an embodiment.

FIG. 5 is a flowchart for describing a method for training an image classification model according to an embodiment. The method illustrated in FIG. 5 may be performed, for example, by the apparatus 100 for training the image classification model described above.

First, the apparatus 100 for training the image classification model trains the model body and the first head through supervised learning based on the labeled data set subjected to type 1 labeling (510).

Thereafter, the apparatus 100 for training the image classification model trains the model body, the first head, and the second head through multi-task learning based on the data set subjected to type 1 labeling and the unlabeled data set (520).

Thereafter, the apparatus 100 for training the image classification model trains the plurality of third heads through supervised learning based on labeled data set subjected to type 2 labeling while freezing the model body (530).

In addition, in the illustrated flowchart, the method is described by being divided into a plurality of steps, but at least some of the steps may be performed in a different order, performed together by being combined with other steps, omitted, performed by being divided into detailed steps, or performed by being added with one or more steps (not illustrated).

Figure 6:
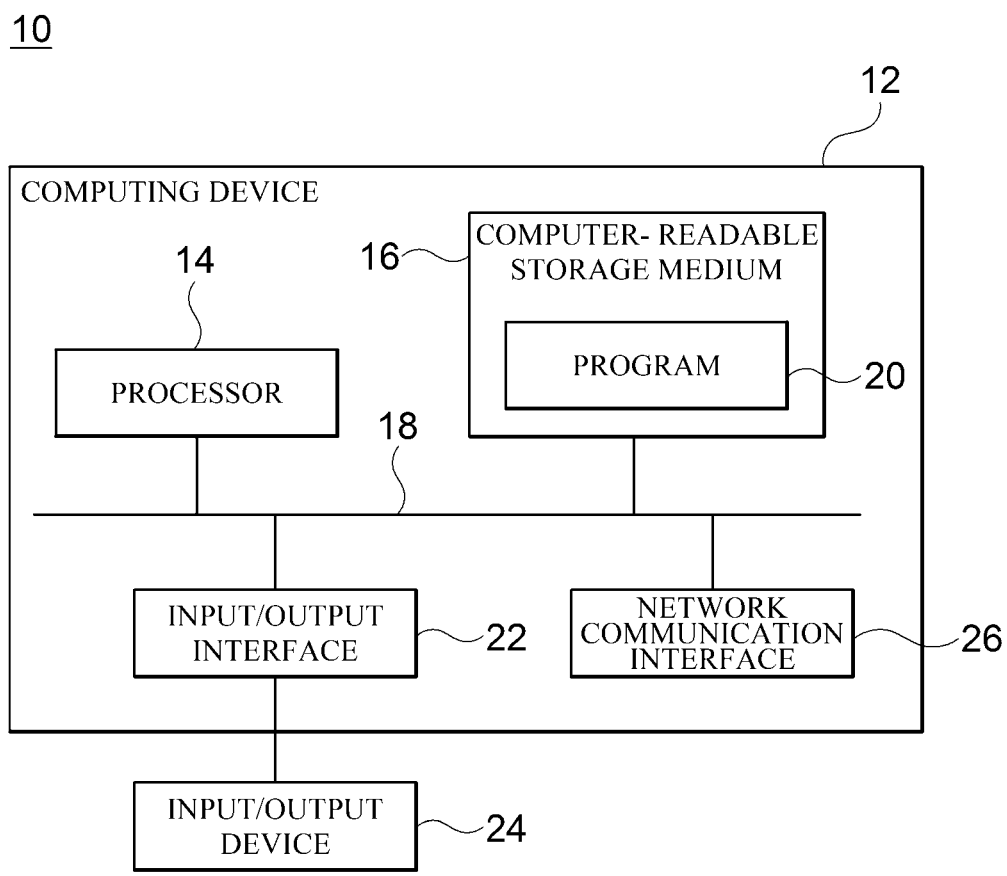
FIG. 6 is a block diagram for illustratively describing a computing environment including a computing device according to an embodiment.

FIG. 6 is a block diagram for illustratively describing a computing environment 10 that includes a computing device according to an embodiment. In the illustrated embodiment, each component may have different functions and capabilities in addition to those described below, and additional components may be included in addition to those described below.

The illustrated computing environment 10 includes a computing device 12. In an embodiment, the computing device 12 may be the apparatus 100 for training the image classification model.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include a high-level language code that can be executed by a computer using an interpreter, etc., as well as a machine language code generated by a compiler.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A method for training an image classification model performed by a computing device including one or more processors and a memory for storing one or more programs executed by the one or more processors, the method comprising:
    a first training step of training a model body and a first head through supervised learning based on a labeled data set subjected to type 1 labeling;
    a second training step of training the model body, the first head, and a second head through multi-task learning based on the labeled data set and an unlabeled data set; and
    a third training step of training a plurality of third heads through supervised learning based on the labeled data set subjected to type 2 labeling while freezing the model body,
    wherein the model body extracts feature vector for input data, and each of the first head, the second head, and the third head generates a classification result based on the feature vector.

2. The method of claim 1, wherein, in the type 1 labeling,
    when image data included in the labeled data set has a single label, the image data having the single label is classified into a class corresponding to the single label; and
    when the image data included in the labeled data set has multiple labels, the image data having the multiple labels is classified into a new class corresponding to the multiple labels themselves.

3. The method of claim 1, wherein, in the second training step, the model body and the first head are trained through supervised learning again based on the labeled data set, and the model body and the second head are trained through self-supervised learning.

4. The method of claim 3, wherein
    in the second training step, the model body and the first head are trained through supervised learning again by reflecting changes to one or more hyper parameters obtained from a user.

5. The method of claim 3, wherein, in the second training step, the model body and the second head are trained through self-supervised learning based on derived data transformed from image data included in the labeled data set.

6. The method of claim 1, wherein, in the second training step, the model body and the first head are trained through unsupervised learning based on the unlabeled data set.

7. The method of claim 1, wherein, in the type 2 labeling, each image data included in the labeled data set is subjected to binary classification according to whether or not each image data included in the labeled data set has a label corresponding to a specific class.

8. The method of claim 1, wherein, in the third training step, based on the labeled data set classified into a plurality of classes according to the type 2 labeling, each of the plurality of third heads corresponding to each of the plurality of classes is trained through supervised learning.

9. An apparatus for training an image classification model comprising:
    a first trainer that trains a model body and a first head through supervised learning based on a labeled data set subjected to type 1 labeling;
    a second trainer that trains the model body, the first head, and a second head through multi-task learning based on the labeled data set and an unlabeled data set; and a third trainer that trains a plurality of third heads through supervised learning based on the labeled data set subjected to type 2 labeling while freezing the model body,
wherein the model body extracts feature vector for input data, and each of the first head, the second head, and the third head generates a classification result based on the feature vector.

10. The apparatus of claim 9, wherein, in the type 1 labeling,
when image data included in the labeled data set has a single label, the image data having the single label is classified into a class corresponding to the single label; and
when the image data included in the labeled data set has multiple labels, the image data having the multiple labels is classified into a new class corresponding to the multiple labels themselves.

11. The apparatus of claim 9, wherein the second trainer trains the model body and the first head through supervised learning again based on the labeled data set, and trains the model body and the second head through self-supervised learning.

12. The apparatus of claim 11, wherein the second trainer trains the model body and the first head through supervised learning again by reflecting changes to one or more hyper parameters obtained from a user.

13. The apparatus of claim 11, wherein the second trainer trains the model body and the second head through self-supervised learning based on derived data transformed from image data included in the labeled data set.

14. The apparatus of claim 9, wherein the second trainer trains the model body and the first head through unsupervised learning based on the unlabeled data set.

15. The apparatus of claim 9, wherein, in the type 2 labeling, each image data included in the labeled data set is subjected to binary classification according to whether or not each image data included in the labeled data set has a label corresponding to a specific class.

16. The apparatus of claim 9, wherein the third trainer, based on the labeled data set classified into a plurality of classes according to the type 2 labeling, trains each of the plurality of third heads corresponding to each of the plurality of classes through supervised learning.

\* \* \* \* \*